(No Model.)
C. MANN.
OIL EXTRACTING APPARATUS.
No. 482,581. Patented Sept. 13, 1892.
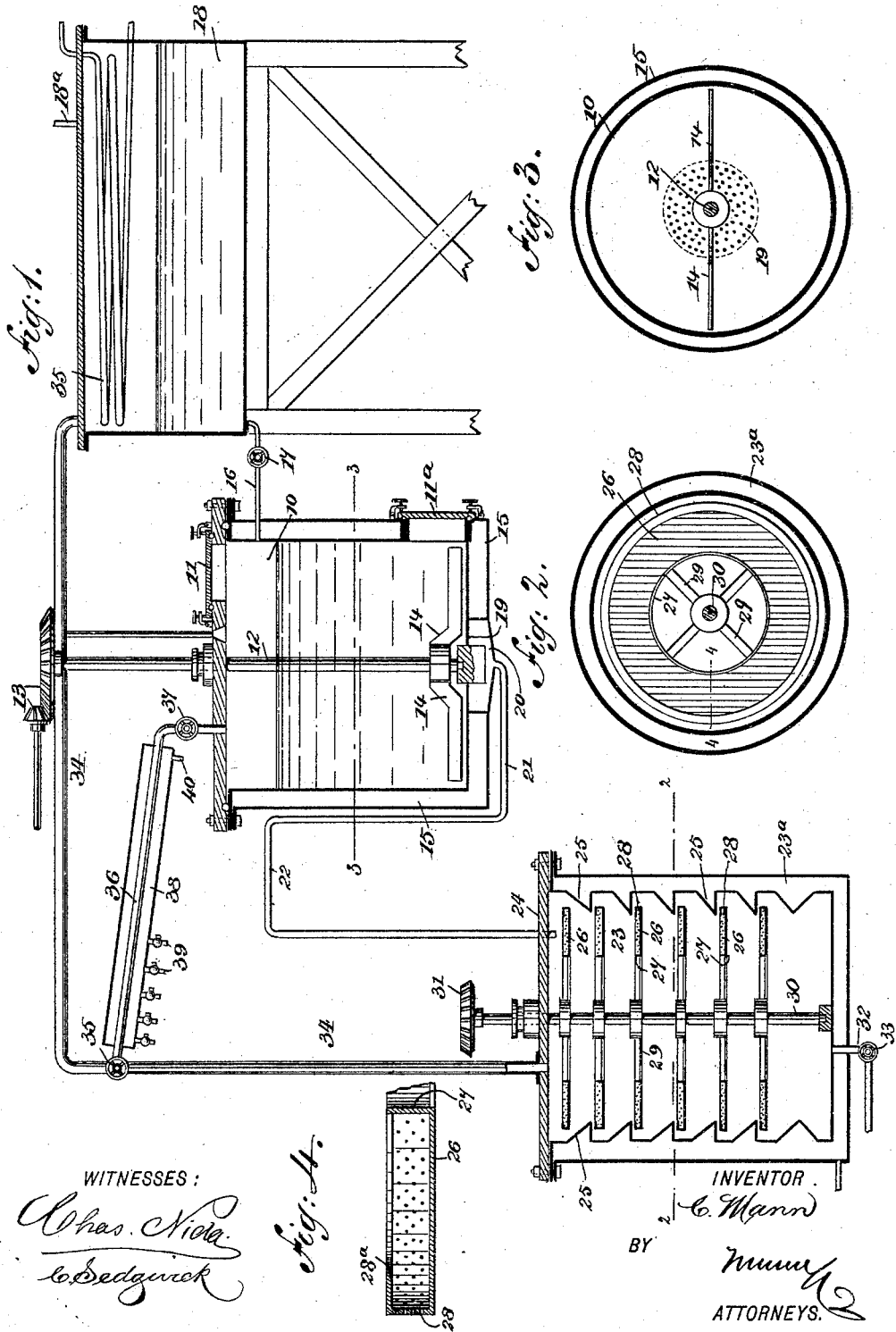
WITNESSES:
Chas. Niola
C. Sedgwick
INVENTOR
C. Mann
BY
Munn
ATTORNEYS.

UNITED STATES PATENT OFFICE.

CHARLES MANN, OF NEW YORK, N. Y.

OIL-EXTRACTING APPARATUS.

SPECIFICATION forming part of Letters Patent No. 482,581, dated September 13, 1892.

Application filed June 8, 1892. Serial No. 435,939. (No model.)

*To all whom it may concern:*

Be it known that I, CHARLES MANN, of New York city, in the county and State of New York, have invented a new and useful Improvement in Oil-Extracting Apparatus, of which the following is a full, clear, and exact description.

My invention relates to improvements in that class of oil-extracting apparatus which is adapted for use in extracting oil from cotton-seed, linseed, and analogous substances.

The object of my invention is to produce a simple apparatus by means of which the process may be rapidly carried on, which also enables every part of the seed to be brought into contact with the extracting fluid and the heated surfaces which facilitate the extraction of oil, which is provided with a means of rapidly evaporating the extracting fluid and separating it from the extracted oil, which also is adapted to quickly deodorize the oil, and which saves the extracting fluid, condenses it, and carries it back to the main tank, so that it may be repeatedly used.

To this end my invention consists in an oil-extracting apparatus, the construction of which will be hereinafter described and claimed.

Reference is to be had to the accompanying drawings, forming a part of this specification, in which similar figures of reference indicate corresponding parts in all the views.

Figure 1 is a sectional elevation showing the construction and arrangement of the entire apparatus. Fig. 2 is a sectional plan of the evaporator and deodorizer proper on the line 2 2 in Fig. 1. Fig. 3 is a sectional plan of the extractor proper on the line 3 3 in Fig. 1, and Fig. 4 is a broken enlarged cross-section on the line 4 4 in Fig. 2.

The apparatus includes an extractor or tank 10, which is closed entirely, and is provided with a removable cover 11, so that it may be conveniently filled, this cover being located at the top of the tank, and at the bottom with a removable door 11ª, this being removed when the seed from which the oil has been extracted is to be removed. Extending centrally through the tank is a revoluble shaft 12, which is stepped in a suitable bearing and turns in a common form of stuffing-box at the top, the shaft being driven by gearing 13, as shown in Fig. 1. On the lower end of the shaft are radially-extending blades 14, which serve to stir up the seed or meal in the tank, and while only two blades are shown in the drawings it will be understood that any number may be used.

The tank is inclosed by a steam-jacket 15, space being left for the introduction of sufficient steam to thoroughly heat the tank, and it will be seen that the tank will be kept hot and the blades 14, by constantly stirring the meal or seed in the tank, will throw every part of said substance against the heated walls of the tank, bring the same in continuous contact with the extracting fluid, and thus the rapid and thorough extraction of oil will be hastened.

The tank is supplied with naphtha, ether, or other extracting-fluid by means of a pipe 16, which is controlled by a cock 17 and which leads from a tank 18 to the upper portion of the extractor. The extractor-tank 10 has in the bottom a sieve 19, beneath which is a receptacle 20, and from this leads a siphon-pipe 21, which is bent upward at one side of the tank 10, as shown at 22, its bend extending nearly to the top of the tank. The siphon-pipe delivers into the top of the evaporator and deodorizer, which includes a tank 23, having a removable cover 24. The tank 23 has a series of annular inclined ledges 25, which are arranged one above another and project inward into the tank, these ledges being held to deliver upon spraying-plates 26, which, also, are arranged one above another within the tank. Each plate is provided with concentric flanges 27 and 28, the inner flange 27 surrounding an open central portion of the plate, through which extend supporting-arms 29, which carry the plates and which are secured to a vertical shaft 30, which is journaled in the tank and is driven by a gear-wheel 31 above the tank. Each flange 28 is doubled over, preferably at the top, as shown at 28ª in Fig. 4, and the flange 28 is pierced by numerous perforations, as shown in Fig. 4, so that the mixed oil and extracting fluid will be thrown through the flange and be delivered in a fine spray upon the adjacent ledge 25. The tank 23 is inclosed by a steam-jacket 23ª, which is kept filled with live steam, so that the tank is kept hot, and when the stirred liquid strikes the ledges the extracting fluid evaporates instantly, while the oil trickles downward to the bottom of the tank. It will be seen that the extracted fluid will be delivered from the upper plate 26 to the upper ledge 25, from which it will run to the next plate below, and so on downward to the tank-bottom, and consequently but very little of the extracting fluid reaches the bottom of the tank, and when the oil arrives at this point it is pure and free from odor.

A pipe 32, which is controlled by a cock 33, opens from the bottom of the tank 23, and through this the extracted oil is drawn. Opening from the top of the tank 23 is a pipe 34, which leads back to the tank 18 and delivers upon a cooling-coil 35, which is arranged in the top of the tank, and the extracting fluid, which passes through the pipe 34 in the form of vapor, is condensed upon the coil 35 and is received in liquid shape in the tank 18. The tank is also provided with an inlet-pipe 18ª, so that it may be filled when necessary.

Opening from the pipe 34 at a point above the extractor is a pipe 36, the inlet to this pipe being controlled by a cock 35, which is a common form of two-way cock, so that the vapor in the pipe 34 may be allowed to pass onward to the tank 18 or may be sent through the pipe 36. The latter delivers into the top of the extractor-tank 10 and is controlled by a cock 37. The pipe 36 is enveloped by a cooling-jacket 38, which is filled with cold water and is provided with suitable faucets 39 and drain-pipe 40, so that the water may be readily sent through it and drawn from it. This construction enables the vapor or extracting fluid to be delivered to the extracting-tank in the hottest possible condition consistent with safety.

The operation is carried on in the following way: The extracting-tank 10 is nearly filled with the prepared seed and its cover can be fastened in place, and a sufficient quantity of the extracting fluid is let into the tank 10 through the pipe 16, after which the cock 17 of the pipe 16 is closed. The steam-jackets 15 and 23ª are kept filled with steam and the shafts 12 and 30 are kept in motion. The cock 35 is also turned, so that the evaporated fluid will pass from the tank 23 through the pipes 34 and 36 into the tank 10. When the operation is started, the stirring-blades 14 will constantly throw new matter that has not been acted upon to the side walls of the tank, and as these walls are hot the extracting process takes place rapidly. It will be understood that the tank 10 is filled to a point as high as the bend 22 in the siphon-pipe 21, and consequently the extracting fluid passes downward through the sieve 19 and outward through the pipe 21, taking with it the oil which is extracted from the prepared seed in the tank 10. The mixed oil and extracting fluid are delivered upon the plates 26 in the manner described, and the rotary motion of the shaft 30 creates sufficient centrifugal force to throw the oil and extracting fluid out through the perforated flanges 28 and deliver the mixed liquid in a fine spray upon the heated ledges 25, and the oil passes to the bottom, while the extracting fluid quickly evaporates and rises, passing off through the pipes 34 and 36 to the tank 10. The cooling-jacket 38 causes the fluid to be delivered in liquid form to the tank, and the operation is thus continuous and is kept up until every particle of oil is extracted. When the seed has been sufficiently acted upon, the cock 35 is turned so as to permit the evaporated extracting fluid to pass back to the tank 18, after which the cock 33 is opened and the oil withdrawn from the tank 23. After the oil has been extracted in the manner described, the tank 10 may be thoroughly heated, the meal or seed within the tank stirred, as described, and all traces of odor will be removed from the seed or meal, after which the seed or meal is discharged from the tank by the action of the stirrer through the opening closed by the door 11ª.

Having thus described my invention, I claim as new and desire to secure by Letters Patent—

1. An apparatus for extracting oils, comprising a steam-jacketed extracting-tank provided with a strainer in its bottom and a rotary stirrer, a steam-jacketed evaporator in a lower plane than the extractor, a pipe connecting the bottom of the extractor with the top of the evaporator, a centrifugal spraying mechanism in the said evaporator, and a vapor-pipe leading from the top of the evaporator into the top of the extractor, whereby the vaporized extracting fluid will be conducted back to the extractor, substantially as set forth.

2. An apparatus for extracting oils, comprising a steam-jacketed extracting-tank provided with a stirring mechanism and a strainer in its bottom, a tank for the extracting fluid provided with a pipe leading into the extractor, a centrifugal steam-jacketed evaporator, a pipe leading from the extractor below its strainer into the upper end of the evaporator, a vapor-pipe leading from the upper end of the evaporator back to the extracting-fluid tank and having a branch pipe leading into the top of the extractor, and valves and cooling devices for said vapor-pipes, substantially as set forth.

3. In an apparatus of the character described, the evaporator comprising a steam-jacketed tank provided in its top with an inlet for the oil and extracting fluid, a centrifugal spraying mechanism in the tank receiving the oil and fluid and spraying it against the heated walls of the tank to vaporize the fluid, a vapor-outlet in the top of the tank, and an oil-outlet in its bottom.

4. In an apparatus of the character described, the evaporator comprising a steam-jacketed tank, the inner wall of which is formed with a series of inwardly-projecting annular ledges 25, a series of horizontal peripherally-perforated sprayers, one projecting under each ledge to receive the oil therefrom and discharge it against the ledge next below, a supply-pipe for the oil and fluid discharging upon the top sprayer, a vapor-outlet in the top of the tank, and an oil-outlet in its bottom.

CHARLES MANN.

Witnesses:
WARREN B. HUTCHINSON,
C. SEDGWICK.